Nov. 17, 1953 K. EZR 2,659,847
SIGNAL RESPONSIVE DRIVING OR FOLLOW-UP DEVICE
Filed June 26, 1952 3 Sheets-Sheet 1

INVENTOR
Karel Ezr
BY

Nov. 17, 1953 K. EZR 2,659,847
SIGNAL RESPONSIVE DRIVING OR FOLLOW-UP DEVICE
Filed June 26, 1952 3 Sheets-Sheet 2

INVENTOR
Karel Ezr
BY

Patented Nov. 17, 1953

2,659,847

UNITED STATES PATENT OFFICE 2,659,847

SIGNAL RESPONSIVE DRIVING OR FOLLOW-UP DEVICE

Karel Ezr, Prague, Czechoslovakia, assignor to Tesla, Narodni Podnik, Prague, Czechoslovakia, a corporation of Czechoslovakia Application June 26, 1952, Serial No. 295,801

16 Claims. (Cl. 318—21)

This invention relates to signal responsive driving or follow-up devices and, more particularly, to a reversible follow-up mechanism or device providing a relatively large magnitude operating force proportional to a relatively small magnitude signal and operating in a direction determined by the sense of the signal.

Devices of the type to which the invention relates are designed to produce predetermined linear, rotary or other movement of a controlled device, such as an actuator or a recorder, responsive to a control signal. They are frequently used in remote control operating or recording systems.

For best results, the devices should be readily responsive to changes in indicated operating direction, rugged, simple, and operable on a low power input, while being capable of providing a sufficiently large operating force to assure positive movement of the controlled apparatus responsive to the controlling impulse or signal.

In accordance with the present invention, a novel, simple and efficient follow-up mechanism is provided which fulfills the foregoing requirements completely. More specifically, the invention comprises a reciprocable or oscillatable member or operator with which is frictionally associated a movable follow-up element having an appreciable moment of inertia. The friction between the operator and the follower is independent of the speed of the movement of the contact faces of the operator and the follower, that is to say, the absolute value of the force which affects the follower due to this friction is constant even if the speed of the movement of the operator is variable. Means are provided to reciprocate or oscillate the operator in such a manner that it is given a quick sharp movement in a direction opposite to the desired movement of the follower and returns in the other direction at a slower steadier space. In both directions of this asymmetrical movement of the operator, the force due to friction between the operator and the follower is the same. But in the direction of the quicker movement of the operator, this force acts on the follower during a shorter period than during the slower movement in the opposite direction. Thus the resulting movement of the follower is in the direction of the slower movement of the operator. It is also possible to adjust the friction between the follower and the operator so that during the quicker movement of the operator the follower does not move with the operator, whereas in the direction of the slower movement it is dragged along with the operator.

The impulses imparted to the operator have a constant frequency and an amplitude and shape corresponding to the controlling signal. Preferably, the impulses are applied magnetically to the operator, with electromagnetic operators being energized with discrete power pulses. To provide the required impulse strength from relatively weak signals, an electronic amplifier may be employed in circuit between the signal source and the electromagnetic dynamic system.

Due to the operator being a relatively light, low inertia element as compared to the follower, only a relatively small power input is required as compared to systems in which impulses are imparted to a relatively heavy operator associated with a relatively light follower. In the invention system, the actual movement of the follower is effected by the springs acting to return the operator to the neutral position, and the power required is only that necessary to move the operator alone.

For an understanding of the invention principles; reference is made to the following description of typical embodiments thereof as illustrated in the accompanying drawings. In the drawings.

Figure 1:
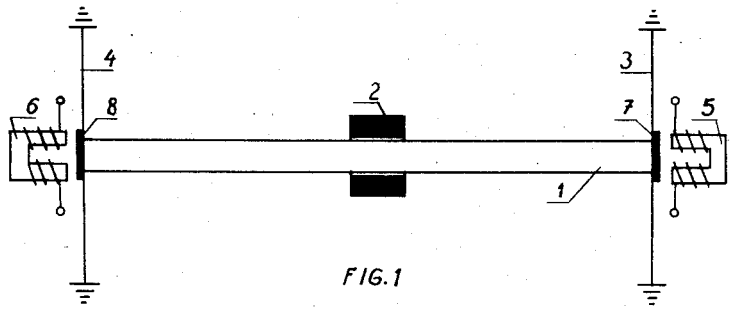
Fig. 1 is a somewhat schematic plan view of a dynamic system embodying the invention.

Referring to Fig. 1, the dynamic system is illustrated as including a relatively low inertia operator or driver in the form of a rod 1. This rod is suspended at its ends on a pair of resilient restoring strips 3 and 4 in such a manner that rod 1 may reciprocate parallel to its length. The follower or driven element comprises a relatively higher inertia member 2 which is slidable along the rod 1 and has frictional engagement thereto.

The relative masses of driver 1 and follower 2 are so selected that, if rod 1 moves quickly in one direction, follower 2 remains practically stationary, with rod 1 sliding through the follower. When rod 1 is returned more slowly in the opposite direction, it carries follower 2 along with it due to friction between the rod and follower. If the friction between the rod and the follower is adjusted in such a manner that the follower is dragged along with the operator in both directions of the movement thereof, the resulting movement of the follower is in the direction of the slower movement of the operator, as explained above.

The operation of this dynamic system depends on the ratio of the frequency of the exciting impulses and the natural mechanical frequency of the dynamic system, the shape and magnitude of oscillation of the driver, the relative masses of the driver 1 and follower 2, and the friction between the driver and follower. If these parameters are properly selected, an efficient, low power consumption, and sensitively responsive dynamic system is provided.

Rod 1 may be reciprocated or oscillated by electromagnets 5 and 6 acting upon paramagnetic end pieces 7 and 8 on the rod 1. The electric current impulses for exciting the electromagnets 5 and 6 may be fed to either or both electromagnets. However, if both electromagnets are excited with pulses of the same frequency and amplitude, having a phase difference of 180°, there will be no net movement of follower 2 as rod 1 would move in both directions at the same speed. Hence, means must be provided to discriminately energize the electromagnets in such manner as to produce unequal movements of rod 1 in opposed directions.

Figures 2, 3:
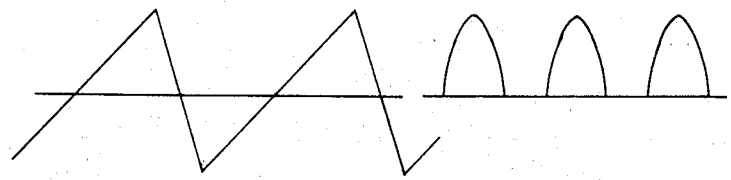
Figs. 2 and 3 illustrate types of electrical pulses which may be utilized to operate the system.

For example, the electromagnets may be energized with saw tooth pulses such as shown in Fig. 2. A simpler way to effect an asymmetrical movement of rod 1 is to utilize the periodic pulses or pulsating current shown in Fig. 3 which are used to energize the dynamic systems whose natural mechanical frequency differs from the frequency of the exciting pulses of Fig. 3. These pulses are fed to only a selected one of the electromagnets 5, 6 in accordance with the sense of the controlling signal. The wave form of Fig. 3 can be produced readily by rectifying sinusoidal alternating current.

Figure 4:
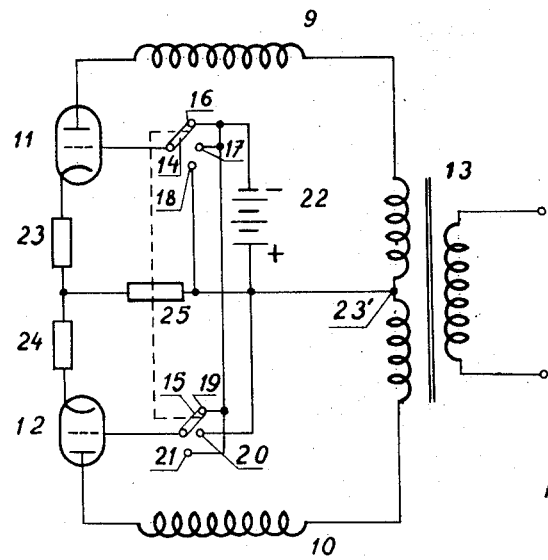
Fig. 4 is a schematic circuit diagram of one form of electronic operator for the dynamic system.

To provide sufficient power for the electromagnets, as well as to provide control of the direction and amount of movement of follower 2, an electronic control system is employed in preference to relays, as the latter are subject to malfunctioning due to contact deterioration. In one form of circuit as shown in Fig. 4, the windings 9, 10 of electromagnets 5, 6 are included in the anode circuits of electronic valves, such as triodes 11, 12 having substantially identical operating characteristics and whose anode circuits are supplied with power from a transformer 13. Triodes 11, 12 are controlled by a double switch 14, 15. In the upper positions 16, 19 of the switch, the control grids of tubes 11, 12 are supplied with a negative bias from D. C. source 22. This bias is sufficiently high to block tubes 11, 12 so that no current flows through electromagnet windings 9, 10.

In the center position 17, 20 of the switch, tube 11 remains blocked but the grid of tube 12 is connected to the center tap 23' of the secondary winding of transformer 13. A pulsating current of the wave form shown in Fig. 3 now flows through electromagnet winding 10.

In the lower position, 18, 21 of switch 14, 15 tube 12 is blocked by the relatively large negative bias on its control grid. However, tube 11 is conductive so that rectified pulsating current flows through winding 9.

Resistors 23, 24, 25 limit current flow through the tube anode circuits. As the contacts of switch 14, 15 only apply potentials to the control grid and have little or no current flow thereacross, contact deterioration is not a problem. Of course, a suitable relay or relays could effectively be substituted for switch 14, 15. If desired, D. C. source 22 can be omitted and grid bias potentials be supplied from transformer 13, with the tubes controlled by phase relations of the grid and plate potentials.

Figure 5:
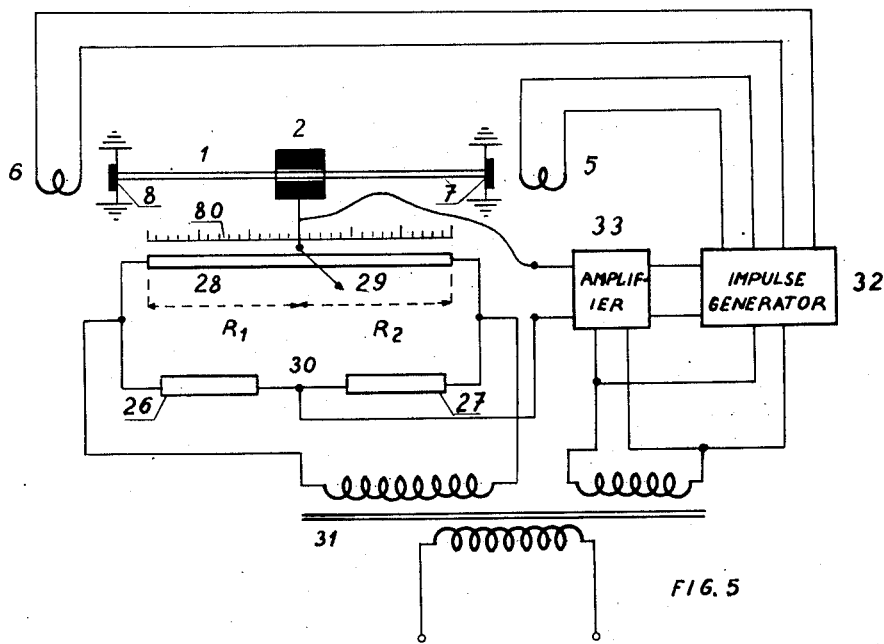
Fig. 5 is a schematic diagram of a measuring or recording system embodying the invention.

Fig. 5 shows a system employing a Wheatstone bridge and amplifiers as the control signal circuit. The bridge comprises resistors 26, 27, as two arms, and/or potentiometer 28 as the other two arms. Potential is applied from transformer 31 and a scale 30 is provided along potentiometer 28 whose sliding contact is carried by follower 2 of the dynamic system.

Resistor 26 is the unknown resistance $R_x$, to be measured, and resistance 27 is the standard resistance $R_n$. The ratio of the left and right arms of potentiometer 28 is given by $a=R_1/R_2$, where $R_1$ is the left arm and $R_2$ the right arm. If the bridge is balanced, there is no potential difference between points 29 and 30. The value of the unknown resistor is given by $R_x=R_n.R_1/R_2=R_n.a$, and can be read off scale 30 by noting the position of the sliding contact along the scale.

If the bridge is not balanced, a potential is produced between points 29 and 30 having a phase difference of 180° depending upon whether point 29 is to the right or to the left of the balance point on potentiometer 28. This potential is amplified by amplifier 33 and fed to impulse generator 32. The latter may be, for example, the arrangement shown in Fig. 4. Properly shaped pulses are selectively fed to electromagnets 5 or 6, depending upon the relative phase of the bridge output potential, to oscillate rod 1. The parameters of the system are so selected that follower 2 is moved in a direction to restore the bridge balance by moving point 29 along potentiometer 28. When balance is effected, the value of resistor 26 ($R_x$) can be read from scale 30. Capacitors or inductances can be used in the bridge circuit when it is desired to measure an unknown capacity or inductance.

If the control signal is D. C., a D. C. amplifier may be used with the arrangement of Fig. 4. However, such D. C. amplifiers have known disadvantages such as high production costs and difficulty of stabilizing the bias point. Consequently, it is desirable to convert the D. C. signal into A. C. of a frequency equal to the oscillation frequency of rod 1, amplify the A. C., and use the amplified A. C. to directly control the tubes connected to the electromagnets. A suitable circuit for effecting this is shown in Fig. 6.

Figure 6:
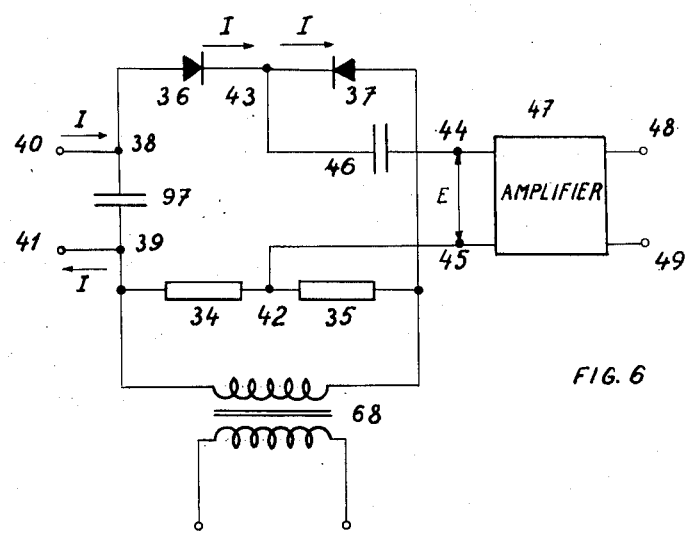
Fig. 6 is a schematic wiring diagram of another form of electronic operator for the system.

The circuit of Fig. 6 includes a bridge comprising two resistors 34, 35 and two substantially identical dry type rectifiers 36, 37 connected in polarity opposition. A transformer 68 supplies to the bridge an A. C. potential so small that the rectifiers 36, 37 have linear characteristics within the potential range. In series with rectifier 36 is a capacitor 97 of such high capacity that, with the applied A. C. potential, the capacitor impedance is negligible compared with that of the rectifier. A D. C. signal voltage is applied, through terminals 40 and 41, to the points 38, 39 on either side of capacitor 97.

When the signal voltage is zero, there is no potential between bridge output terminals 42, 43. However, when there is an applied signal voltage, the resistance of one rectifier is increased and that of the other decreased dependent upon the polarity of the D. C. signal voltage. As the bridge balance is upset, an output potential appears between points 42, 43, and is applied, through capacity 46, to the input terminals 44, 45 of an amplifier 47. The amplified A. C. potential is applied to the grids of the electromagnet control tubes.

The phase of the amplified A. C. potential is dependent upon the polarity of the D. C. signal. As the value of the output A. C. signal cannot be greater than the applied A. C. potential, special precautions are not necessary to safeguard amplifier 47 from overexcitation if the D. C. signal reaches too high a value.

The arrangement of Fig. 6 can be used with the bridge measurement circuit of Fig. 5 to control the position of follower 2 on rod 1.

Figure 7:
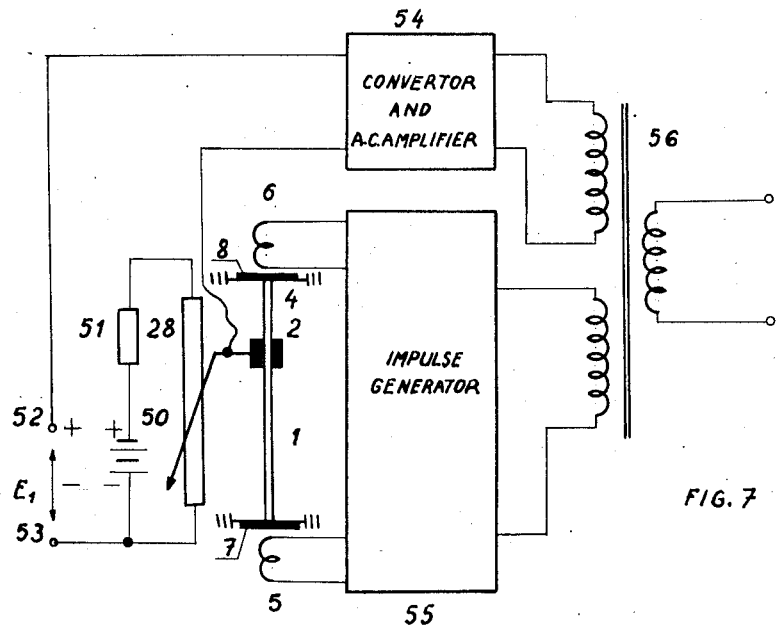
Fig. 7 is a schematic diagram of another form of measuring or recording system embodying the invention.

Fig. 7 shows the application of the invention to a recording or control system. Potentiometer 28 has a D. C. potential applied thereto from source 50 through series resistor 51 which reduces the D. C. potential to such a value that the potential across the whole potentiometer 28 corresponds to the maximum value of the D. C. signal voltage. This latter voltage $E_1$ is applied to terminals 52, 53, and potentiometer 28 is adjusted until the potentials at points 29 and 52 are equal.

Should these latter potentials be unequal, the potential difference is applied to a convertor and A. C. amplifier 54 to provide an amplified signal for impulse generator 55, devices 54 and 55 being supplied from a transformer 56. The impulses from 55 selectively energize electromagnets 5, 6 to adjust follower 2 to the balance point at which the potentials at 29 and 52 are equal. The phase of the impulses is, of course, dependent upon the polarity of the applied D. C. potential.

Other known signal responsive arrangements can be substituted for potentiometer 28. Also, if the arrangement of Fig. 7 is used with applied A. C. signals, the conversion section of device 54 may be omitted. By way of example, a movable core or movable coil inductance can be substituted for potentiometer 28.

Figures 8, 9:
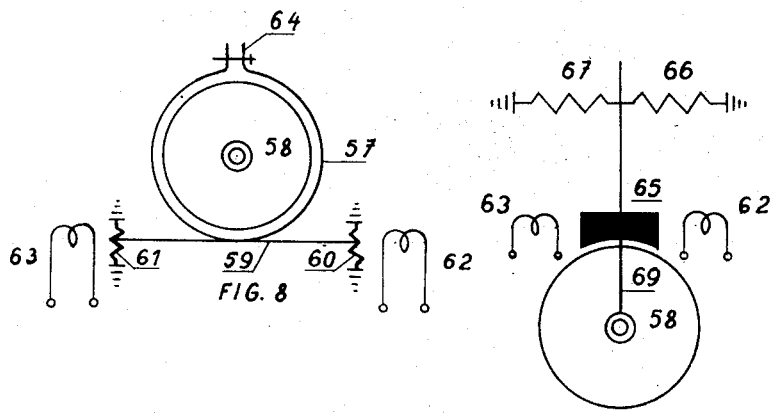
Figs. 8 and 9 illustrate the invention dynamic system as applied to obtain a rotary follow-up movement.

Figs. 8 and 9 show the dynamic system as used to effect rotary movement of a follower. In Fig. 8, the oscillating operator comprises a claw strip 57 surrounding and frictionally cooperable with a rotatable disk follower 58. Strip 57, preferably of stiff material, is connected to a draw rod 59 mounted on resilient supports 60, 61. Rod 59 and strip 57 are oscillated by electromagnets 62, 63. The amount of friction between strip 57 and follower disk 58 is controlled by a clamping screw 64. As strip 57 is impulsed rapidly in one direction, it slips over follower 58 due to the inertia of the latter. On its slower return movement, strip 57 drags follower 58 to rotate in the desired direction.

In the arrangement of Fig. 9, the operator is a jaw 65 mounted on a radial arm 69 swingable about the rotational axis of follower disk 58. Jaw 65 is frictionally cooperable with disk 58. Arm 69 is biased to an intermediate position by springs 66, 67, and jaw 65 is oscillated, about the axis of disk 58, by electromagnets 62, 63.

While specific embodiments of the invention have been shown and described in detail to illustrate the application of the invention principles, it will be understood that the invention may be embodied otherwise without departing from such principles.

What I claim is:

1. A dynamic system comprising, in combination, an oscillatably mounted operator; resilient restoring means associated with said operator and biasing the same to a neutral position; a relatively high inertia follower in constant value frictional engagement with said operator; and means for applying to said operator relatively sharp impulses to move the same rapidly in a selected direction against the force of said restoring means and relative to said follower; said restoring means returning the operator to the intermediate position following each impulse and at a relatively slow rate such that the operator frictionally drags the follower with it during such return movements.

2. A dynamic system comprising, in combination, an oscillatably mounted operator; resilient restoring means associated with said operator and biasing the same to a neutral position; a relatively high inertia follower in constant value frictional engagement with said operator; and means for supplying to said operator impulses whose frequency is different from the natural mechanical frequency of the said dynamic system to move the operator rapidly in a selected direction against the force of said restoring means and relative to said follower; said restoring means returning the operator to the intermediate position following each impulse and at a relatively slow rate such that the operator frictionally drags the follower with it during such return movement.

3. A dynamic system compirsing, in combination, an oscillatably mounted operator; resilient restoring means associated with said operator and biasing the same to a neutral position; a relatively high inertia follower in constant value frictional engagement with said operator; and means for supplying to said operator impulses whose frequency is different from the natural mechanical frequency of the said dynamic system, to move the operator rapidly in a selected direction against the force of said restoring means and relative to said follower; said restoring means returning the operator to the intermediate position following each impulse and at a relatively slow rate such that the resulting movement of the follower relative to the operator is in the direction of the slower movement of the latter.

4. A dynamic system comrising, in combination, an oscillatably mounted operator; resilient restoring means associated with said operator and biasing the same to a neutral position; a relatively high inertia follower in constant value frictional engagement with said operator; and electromagnetic means for applying to said operator impulses whose frequency is different from the natural mechanical frequency of the said dynamic system to move the same rapidly in a selected direction against the force of said restoring means and relative to said follower; said restoring means returning the operator to the intermediate position following each impulse and at a relatively slow rate such that the resulting movement of the follower relative to the operator is in the direction of the slower movement of the latter.

5. A dynamic system comprising, in combination, an oscillatably mounted operator; resilient restoring means associated with said operator and biasing the same to a neutral position; a relatively high inertia follower in constant value frictional engagement with said operator; electromagnetic means operable to oscillate said operator; and means for selectively energizing said electromagnetic means with impulses whose frequency is different from the natural mechanical frequency of the said dynamic system to move said operator rapidly in a selected direction against the force of said restoring means and relative to said follower; said restoring means returning the operator to the intermediate position following each impulse and at a relatively slow rate such that the resulting movement of the follower relative to the operator is in the direction of the slower movement of the latter.

6. A dynamic system comprising, in combination, an oscillatably mounted magnetizable operator; resilient restoring means associated with said operator and biasing the same to a neutral position; a relatively high inertia follower in constant value frictional engagement with said operator; electromagnet means operable to oscillate said operator; and means for selectively energizing said electromagnet means with impulses whose frequency is different from the natural mechanical frequency of the said dynamic system to move said operator rapidly in a selected direction against the force of said restoring means and relative to said follower; said restoring means returning the operator to the intermediate position following each impulse and at a relatively slow rate such that the resulting movement of the follower relative to the operator is in the direction of the slower movement of the latter.

7. A dynamic system as claimed in claim 3 in which said operator comprises a rod oscillatable parallel to its length and said follower is slidably mounted on said rod.

8. A dynamic system as claimed in claim 3 in which said operator comprises a rod oscillatable parallel to its length and said follower is slidably mounted on said rod; said restoring means comprising resilient suspension elements connected to each end of the rod.

9. A dynamic system as claimed in claim 6 in which said operator comprises a rod oscillatable parallel to its length and said follower is slidably mounted on said rod; said electromagnet means comprising an electromagnet adjacent each end of the rod.

10. A dynamic system as claimed in claim 6 in which said operator comprises a rod oscillatable parallel to its length and said follower is slidably mounted on said rod; said restoring means comprising resilient suspension elements connected to each end of the rod; and said electromagnet means comprising an electromagnet adjacent each end of the rod.

11. A dynamic system as claimed in claim 3 in which said operator is oscillatable about an axis and said follower is rotatable about said oscillation axis.

12. A dynamic system as claimed in claim 3 in which said operator comprises a claw oscillatable about an axis and peripherally embracing the follower which is rotatable about said axis.

13. A dynamic system as claimed in claim 3 in which said operator comprises a jaw oscillatable about an axis and peripherally engaging the follower which is rotatable about said axis.

14. A dynamic system as claimed in claim 6 in which said electromagnet energizing means comprises a signal responsive electronic pulse generating system; a measuring circuit operable, upon unbalance, to trigger said electronic system; and a balance restoring arrangement connected to said follower and included in said measuring circuit.

15. A dynamic system as claimed in claim 6 in which said electromagnet energizing means comprises a signal responsive electronic pulse generating system; a measuring circuit operable, upon unbalance, to trigger said electronic system; a balance restoring arrangement connected to said follower and included in said measuring circuit; and a signal amplifier connected between said measuring circuit and said electronic system.

16. A dynamic system as claimed in claim 6 in which said electromagnet energizing means comprises a signal responsive electronic pulse generating system; and a measuring circuit including a potentiometer and operable, upon unbalance, to trigger said electronic system; a movable balancing element of said potentiometer being connected to said follower.

KAREL EZR.

References Cited in the file of this patent
UNITED STATES PATENTS

| Number | Name | Date |
|---|---|---|
| 2,585,317 | Holmqvist | Feb. 12, 1952 |